(12) United States Patent
Chess et al.

(10) Patent No.: US 7,069,585 B1
(45) Date of Patent: Jun. 27, 2006

(54) PHYSICAL KEY SECURITY MANAGEMENT METHOD AND APPARATUS FOR INFORMATION SYSTEMS

(75) Inventors: David M. Chess, Mohegan Lake, NY (US); Ian N. Whalley, Pawling, NY (US); Steve R. White, New York, NY (US); John F. Morar, Mahopac, NY (US)

(73) Assignee: International Business Machines Corporation, Armonk, NY (US)

( * ) Notice: Subject to any disclaimer, the term of this patent is extended or adjusted under 35 U.S.C. 154(b) by 979 days.

(21) Appl. No.: 09/641,156

(22) Filed: Aug. 17, 2000

(51) Int. Cl.
*G07F 7/08* (2006.01)

(52) U.S. Cl. .................................................. 726/9

(58) Field of Classification Search .............. 235/441, 235/488, 492; 340/825; 361/737; 380/4, 380/30, 202, 241, 23; 705/56, 76; 711/153; 713/164, 165, 185, 192, 201, 202; 902/26, 902/41; 726/9
See application file for complete search history.

(56) References Cited

U.S. PATENT DOCUMENTS

| | | | | |
|---|---|---|---|---|
| 5,434,562 A | * | 7/1995 | Reardon | .............. 713/200 |
| 6,021,497 A | * | 2/2000 | Bouthillier et al. | ......... 713/202 |
| 6,193,163 B1 | * | 2/2001 | Fehrman et al. | ............ 235/488 |
| 6,212,635 B1 | * | 4/2001 | Reardon | ..................... 713/165 |
| 6,389,542 B1 | * | 5/2002 | Flyntz | ....................... 713/201 |
| 6,718,319 B1 | * | 4/2004 | Fisher et al. | .................. 707/1 |

* cited by examiner

*Primary Examiner*—Gilberto Barrón, Jr.
*Assistant Examiner*—Ellen C Tran
(74) *Attorney, Agent, or Firm*—Chlandt, Greeley, Ruggiero & Perle, L.L.P.; E. Dwayne Nelson, Esq.

(57) ABSTRACT

An apparatus and a method for enabling the secure installation and use of an information system having a plurality of nodes, where the plurality of nodes include at least one information appliance (100) and at least one security console (200). The apparatus includes at least one data-carrying object, referred to as a "key" (301), that contains security-related data, and further includes at least one key receptacle (103, 203) that forms a portion of at least one of the nodes. The key is inserted into the receptacle for reading-out the security-related data for indicating to the information system a desired security configuration. The key is not intended to primarily establish the identity of a particular user or principal, but is instead intended to provide and be instrumental in defining, using a tangible medium, a security configuration that bestows a certain level of authorization or access to a particular user or principal.

52 Claims, 6 Drawing Sheets

PHYSICAL KEY SECURITY MANAGEMENT METHOD AND APPARATUS FOR INFORMATION SYSTEMS

FIELD OF THE INVENTION

This invention relates generally to methods and apparatus for defining and controlling access to resources, including information, in an information system, and more particularly relates to the use of physical objects for defining and controlling access such resources.

BACKGROUND OF THE INVENTION

Currently available information appliances include Personal Digital Assistants (PDAs), digital cameras, multimedia centers, disk drives, printers, etc. This list is continually growing as more devices are constructed to contain intelligence, as well as Internet-connectivity. However, before true information appliances can become generally accepted by and useful to the majority of the consumer public, they must be as simple to buy and install as possible. One of the barriers to this in the current environment is that, for any appliance that stores or utilizes data that the consumer or some other principal considers private or privileged, the tasks involved in security administration, security key-maintenance, and related activities are often too complex and/or error-prone to be reliably performed by the typical information appliance consumer.

OBJECTS AND ADVANTAGES OF THE INVENTION

It is a first object and advantage of this invention to provide an improved technique to simply and reliably manage security-related tasks in an information system that includes one or more information appliances.

It is another object and advantage of this invention to provide an information system that simply and reliably manages security-related tasks through the use of a tangible, physical object that contains security-related data.

It is a further object and advantage of this invention to provide an information system that simply and reliably manages security-related tasks through the use of a plurality of tangible, physical objects containing security-related data, wherein one object, or two or more corresponding related objects, referred to herein as "keys", are inserted within or swiped through receptacles having compatible sensors for reading the security-related data.

SUMMARY OF THE INVENTION

The foregoing and other problems are overcome and the objects of the invention are realized by methods and apparatus in accordance with embodiments of this invention.

The teachings herein provide security-configuration and key-management methods that make use of physical objects to represent keys, and thereby leverage the average consumer's experience with physical keys (e.g., door keys, car keys, etc.) in order to simplify the management of computer security keys, authorizations, and related concepts.

Although the teachings of this invention are presented primarily in the context of the field of information systems and appliances, these teachings may be employed wherever it is desirable to control the security configuration of a system through familiar, physically-based mechanisms.

One aspect of these teachings is that, rather than manipulating menus, creating software keys and certificates, and so on, the user instead deals with physical objects. In one exemplary embodiment, if a consumer purchases a new hard disk, and then installs the disk onto his or her home network or LAN, other devices on the consumer's home network are authorized to store data on the new hard disk by the user placing, for example, a bar-coded tag that comes with the hard disk into one of a plurality of slots or readers in a home security console.

In another exemplary embodiment, the user instead takes a "key" that belongs to the security console and inserts it into a slot in the new hard disk. In a further exemplary embodiment, the user takes a key from a slot in the hard disk, and a key from a slot in the security console, and swaps them, thus "introducing" the two devices to each other.

In one illustrative embodiment, a user authorizes and enables a new device to "represent" the user (also referred to herein as a principal) by inserting or swiping a physical object containing a private key or other secret code. When another party who controls another resource wishes to grant to the user, and the user's device(s), some level of access to the controlled resource, they grant access by inserting or swiping an object representing the user (but not containing any secret data of the user) into the appropriate receptacle on a device corresponding to the resource.

In yet another embodiment, keys are obtained in pairs, and a device is authorized to access a resource by inserting or swiping one of the keys in a receptacle on the device, and the other key of the pair in a receptacle associated with the resource.

In a more general case, keys are obtained in groups which can be divided into subsets in a number of ways, and granting a particular level of access to a resource involves dividing the keys into subsets corresponding to the level of access desired, and providing one subset of keys to the device, and another subset of keys to a receptacle representing the resource.

In other embodiments, devices (including security consoles) may have a number of different receptacles, and different degrees of access are granted or authorized by inserting or swiping the corresponding physical key in different receptacles on the same device. By example, there may one receptacle for "normal access", one receptacle for "guest access" and a third receptacle for "administrator access".

In general, physical contact between the key and the receptacle or reader is not required, so long as the key is placed within a readable distance of the receptacle's or the reader's sensor.

Various levels of detail will be presented with regard to a number of embodiments of these teachings, such as the ability to give "guest" access to a user's home Local Area Network (LAN), or to the user's personal data generally, to a Personal Digital Assistant (PDA) of a visitor or friend, by inserting a "key" from the PDA into one of the "guest" slots on the user's home security console.

The physical key and use of the physical key of this invention is distinguished from conventional cards and the like, such as ATM cards, as the conventional cards merely provide an identification of the card holder, enabling the card holder to obtain already granted access or authorization. In this invention the physical key(s) are used instead to control a security configuration of a system as a whole to determine which users are authorized to obtain what type of access to which resource(s).

An apparatus and a method is disclosed for enabling the secure installation and use of an information system having a plurality of nodes, where the plurality of nodes include at least one information appliance and at least one security console. The apparatus includes at least one data-carrying object containing security-related data, and at least one object receptacle that forms a portion of at least one of the nodes. The data-carrying object is inserted into the receptacle for reading-out the security-related data for indicating to the information system a desired security configuration.

The teachings of this invention provide apparatus for the secure installation and use of an information system having a plurality of nodes, where the plurality of nodes include at least one information appliance and at least one security console. The apparatus includes at least one data-carrying object containing security-related data and at least one object receptacle that forms a portion of at least one of the nodes. A data-carrying object is inserted into the receptacle for reading-out the security-related data for indicating to the information system a desired security configuration.

In one embodiment the data-carrying objects are obtained in groups of at least three, and where access to a resource, including information, is obtained by providing one subset of data-carrying objects from a group to a receptacle associated with a requestor of the resource, and a disjoint set of data-carrying objects from the same group is provided to the security console. Identifications of all individual data-carrying objects in the group may be ascertained by viewing the security console, even if some subset of the data-carrying objects are provided to a receptacle associated with a requestor of the resource. A utilization of different disjoint subsets of the data-carrying objects in a group can indicate different levels of trust to be granted to the requester with respect to the resource, and the utilization of different disjoint subsets of the data-carrying objects in a group can indicate different levels of authorization to be granted to the requestor with respect to the resource. The data-carrying objects in a particular group can be mechanically joined together to form an assemblage, and the assemblage is adapted to be attached to a device through a single connection.

BRIEF DESCRIPTION OF THE DRAWINGS

The above set forth and other features of the invention are made more apparent in the ensuing Detailed Description of the Invention when read in conjunction with the attached Drawings, wherein.

DETAILED DESCRIPTION OF THE INVENTION

Figure 1:
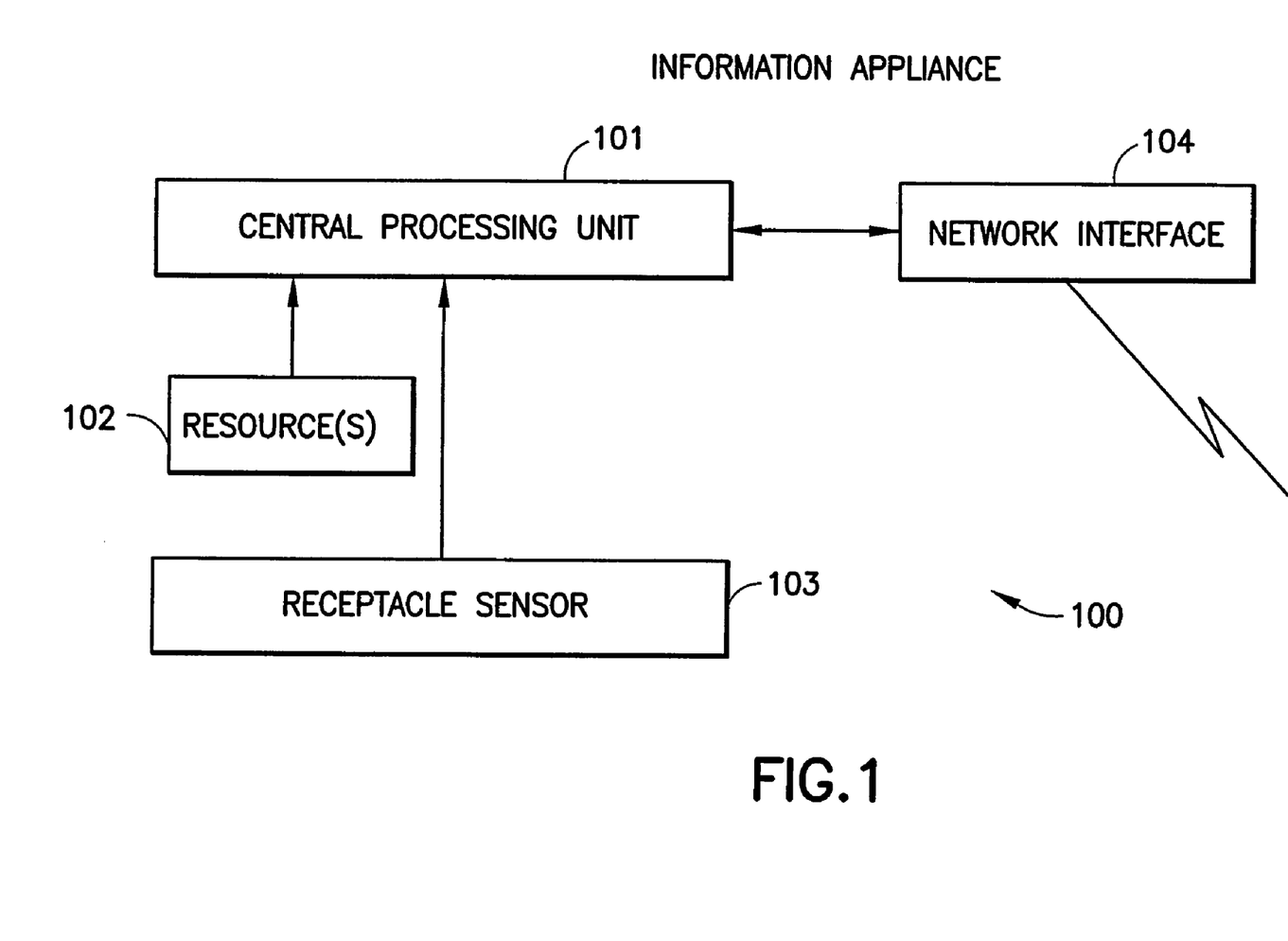
FIG. 1 is a simplified block diagram of an information appliance.

Referring to FIG. 1, and in accordance with a presently preferred embodiment of these teachings, an information appliance 100 includes a central processing unit (CPU) 101 that controls the overall operation of the appliance 100, and that also provides access to its resources 102 (such as, but not limited to, data storage media, printing functions, digital camera image capture, or specialized hardware). The information appliance 100 also includes a receptacle (sensor) 103 which provides to the CPU 101 data contained in or on a data-carrying device, medium or object (301, see FIG. 3) that is inserted into the receptacle 103. It should be noted that, as employed herein, the words "inserted", "inserting", "insertion" and the like are intended to mean placing a data-carrying object 301 into a receptacle 103 (or 203 as shown below) and leaving it in the receptacle for some period of time (e.g., minutes, days, months), as well as to mean only temporarily placing the data-carrying object 301 in the receptacle, or by somehow creating relative motion between the receptacle and the data-carrying object, such as by swiping the object through the receptacle. In this latter case the data-carrying object 301 is considered to be "inserted" into the receptacle 103, 203, even if only for a few seconds. In other embodiments it is only necessary to place the data-carrying object 301 within a readable distance of the sensor 103, and no physical contact or insertion may be required at all.

The information appliance 100 also includes a network interface 104 through which the information appliance 100 communicates with other devices, including other information appliance(s) 100, security console(s) 200, computers, servers and the like. The network interface 104 can be a wired interface or a wireless interface, such as an RF interface or an optical interface.

Figure 2:
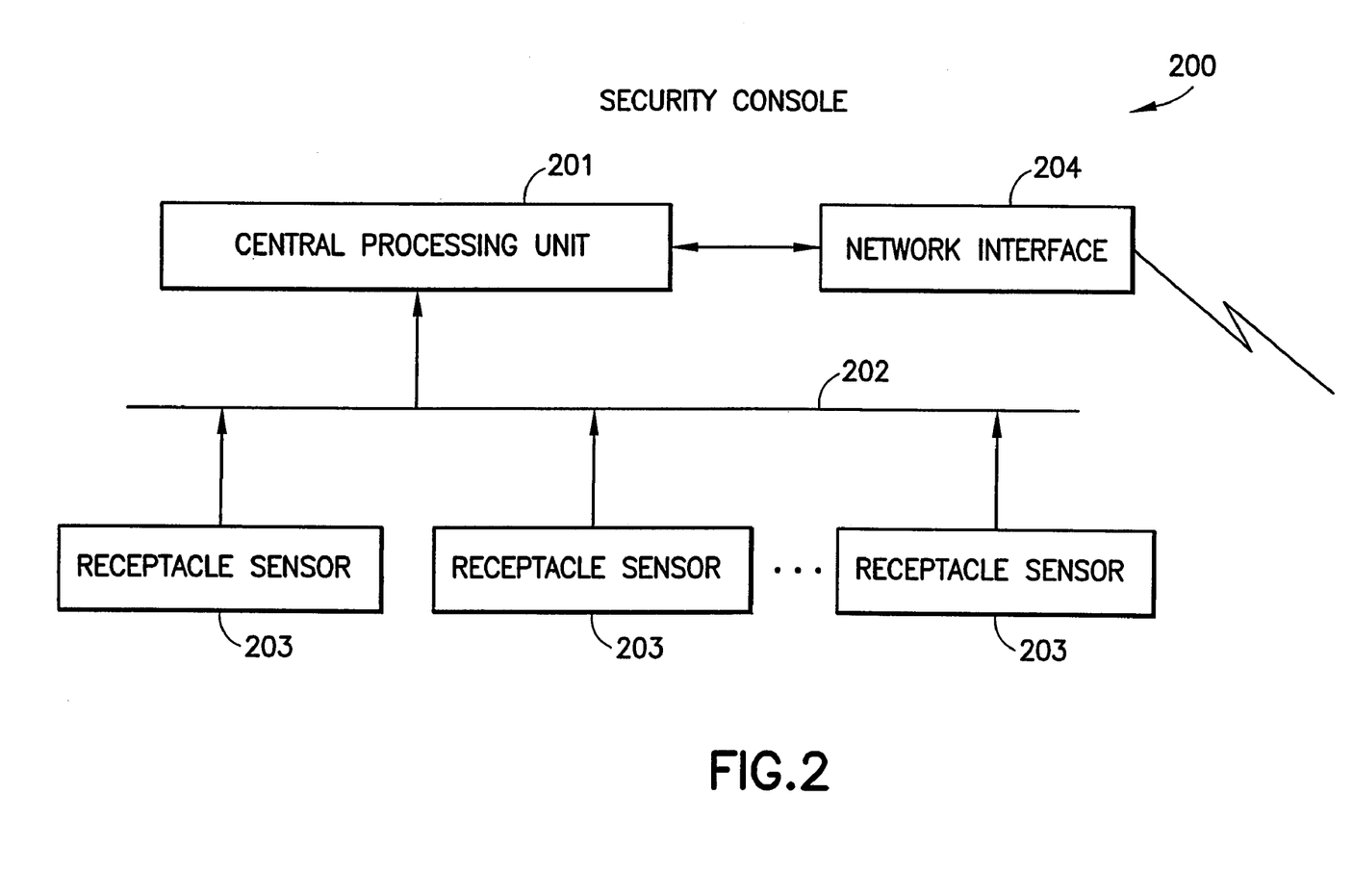
FIG. 2 is a simplified block diagram of a security console.

FIG. 2 illustrates a security console 200 that includes a CPU 201, a bus 202, a plurality of receptacles (sensors) 203, and a network interface 204.

Figure 3:
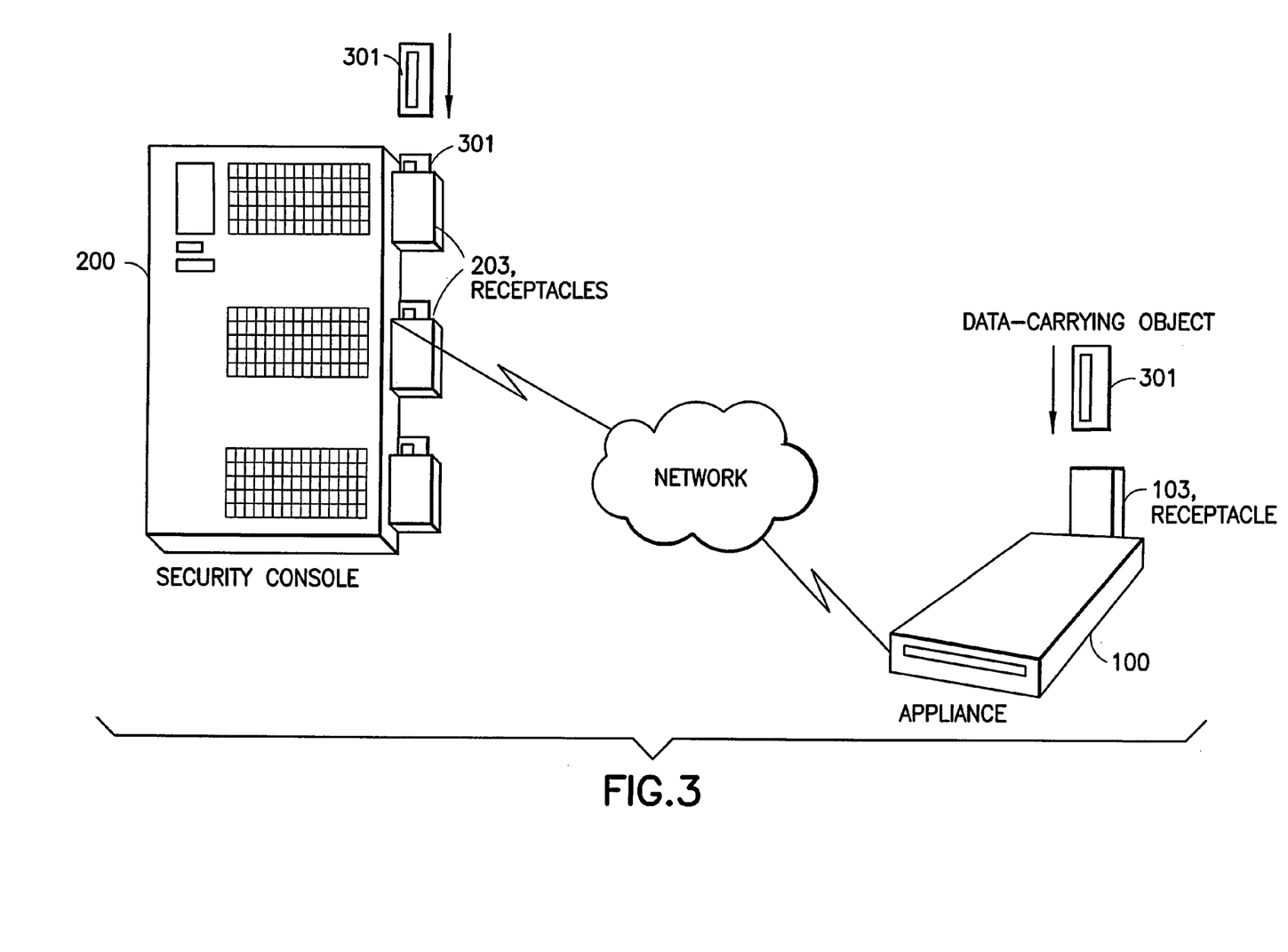
FIG. 3 illustrates a system and network having a security console, at least one information appliance, and that operates using pairs of keys.

FIG. 3 illustrates the operation of the overall system, wherein, in this embodiment, data-carrying objects 301 (hereinafter referred to for brevity as "physical keys" or simply as "keys") are obtained in pairs. When the information appliance 100 is to be granted access to a resource controlled by the security console 200, one of a pair of keys 301 is inserted into a receptacle 103 on the appliance 100, and the other key is inserted into one of the receptacles 203 in the security console 200.

In one embodiment, the data-carrying keys 301 in any given pair are the same shape, and no two data-carrying keys 301 not in the same pair are the same shape. In another embodiment, the data-carrying keys 301 in any given pair are imprinted with the same visible identification code, and no two data-carrying keys 301 not in the same pair are imprinted with the same visible identification code.

In yet another embodiment the data-carrying keys 301 in any given pair are fashioned so as to be mechanically joined together, such as by snapping together, and no two data-carrying keys 301 not in the same pair will snap together (or are unlikely to snap together, as when specific shapes of keys are repeated, but where false matches are unlikely due to the large number of possible shapes).

The security console 200 is shown in FIG. 3 to be a separate network-connected device, although in other embodiments it may be part of, or attached to, a general network console or general-purpose server or other computer.

The security console 200 may have a number of different receptacles 203, reflecting a number of different roles that the corresponding device (information appliance 100) may play in the network. Each role reflects both how trusted the information appliance 100 is (e.g., completely trusted, or trusted only as a "guest"), and what purpose the information appliance 100 serves (e.g., storage, printing, display, general-purpose peer functions, and so on).

When a new information appliance 100 is obtained, a pair of keys 301 are also obtained, and one key 301 is inserted into the information appliance 100, thereby effectively informing the appliance 100 of its identity, and the other key 301 is inserted into the security console 200, thereby effectively informing the security console 200 of the role that the information appliance 100 will play in the overall network. In this manner the network security policy can be established with respect to one or more information appliances 100 and the security console 200, and/or any other object-controlling resources that may be present, and that also include at least one receptacle 203.

In this embodiment, the data stored on the keys 301 includes a cryptographic key, certificate, or other security-related data, and is stored on a magnetic strip by methods known to the art, in the same way that data is commonly stored on credit cards and cards for Automated Teller Machines (ATMs). In alternate embodiments, the data is stored in a small computer embedded in the key (by methods known to the art as used in "smart cards"), or printed on the key in the form of a UPC or other "bar code" known to the art. In general, the data may be stored on or in the key(s) 301 by any suitable technique, and the corresponding receptacle(s) 103, 203 are assumed to incorporate a corresponding and suitable sensor (e.g., magnetic, optical, electrical, etc.) for reading stored data from the key 301.

Figure 4A:
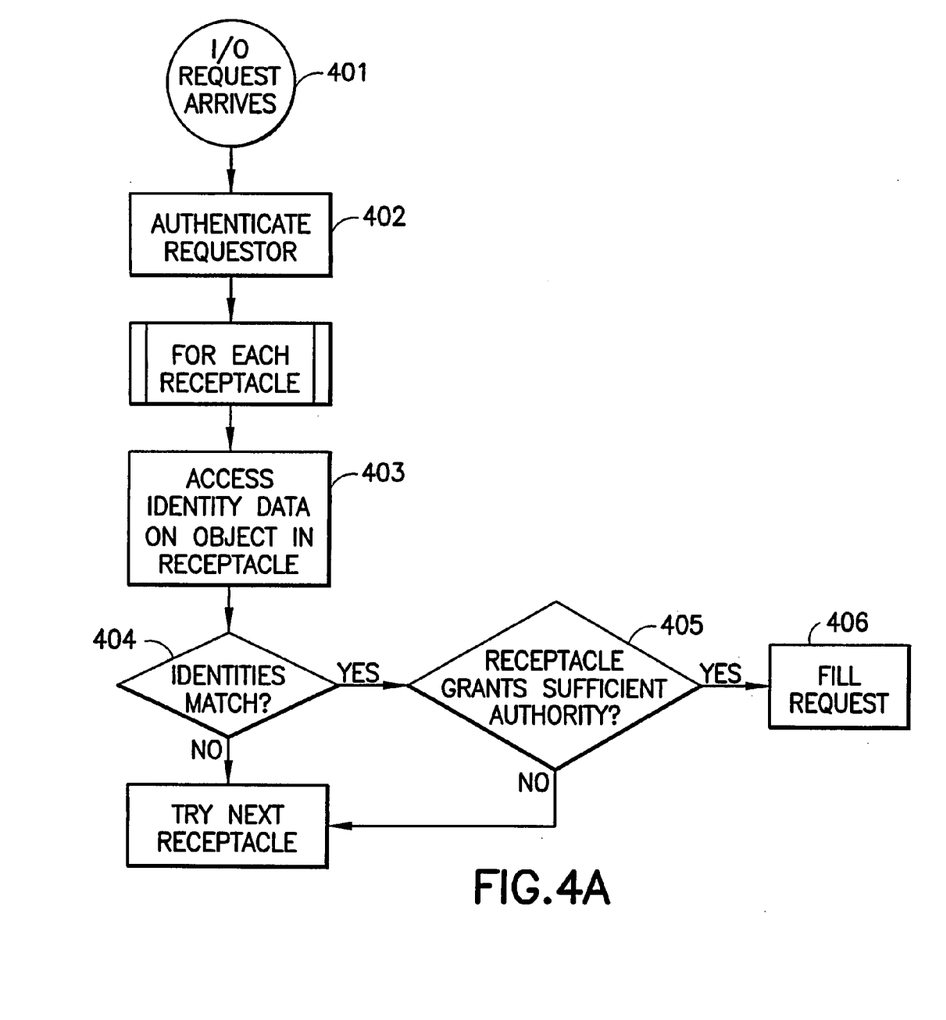
FIGS. 4A and 4B are each a logic flow diagram depicting the operation of the security console of FIGS. 2 and 3.

With reference now to the logic flow diagrams of FIGS. 4A, 4B, 5A and 5B, and more particularly first to FIG. 4A, when the security console 200 receives (401) a request from an information appliance 100, it iterates through each of the keys 301 that are present in its various receptacles 203 to authenticate the requestor (402). During the iteration, for each (receptacle) key 301 that is present, data is accessed (403) from the key 301, and preferably using encryption and authentication methods known to the art, a determination is made (404) whether or not that particular key 301 corresponds to the information appliance 100 from which the request was received. If none of the keys 301 in the receptacles 203 match, the request is rejected, while in an alternative embodiment, the request may be given only "public" or "anonymous" privileges. If a key 301 in one of the receptacles 203 does match, the security console 200 determines whether the functional role corresponding to the (matching) receptacle 203 has sufficient privileges to perform the request (405). If not, the request is rejected and the next receptacle 203 is tried, otherwise the request is filled (406). In an alternative embodiment, the functional role corresponding to the receptacle 203 containing the matching key 301 is used to determine the privileges granted to the requester, and therefore in determining what parts of the request are fulfilled, and how, using standard access-control algorithms known to the art.

Figure 4B:
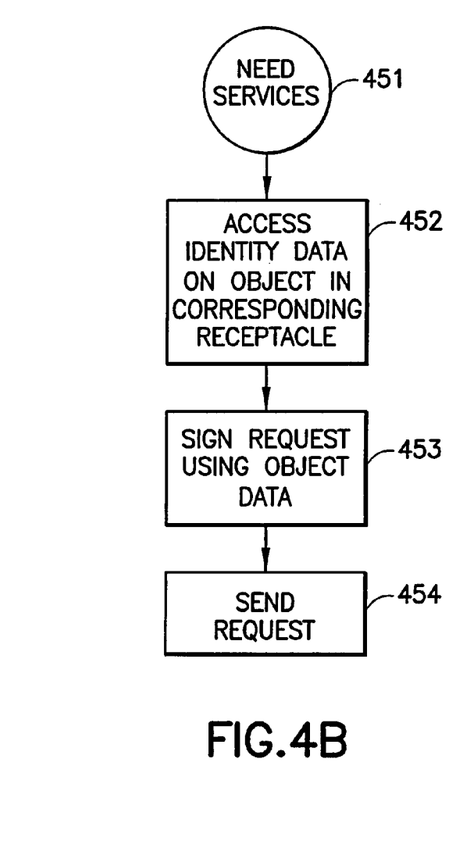

Referring to FIG. 4B, when the security console 200 requires services from a device (451), it accesses (452) the identity data stored in the key 301 that resides in the receptacle 203 corresponding to the information appliance's role (e.g., data storage, image capture, etc.) It uses the accessed data to encrypt and/or sign a request (453), using methods known to the art, so that the information appliance 100 can determine that the request was actually generated by the security console 200, and was actually intended for the specific information appliance 100. The request is then sent to the information appliance 100 (454).

Figure 5A:
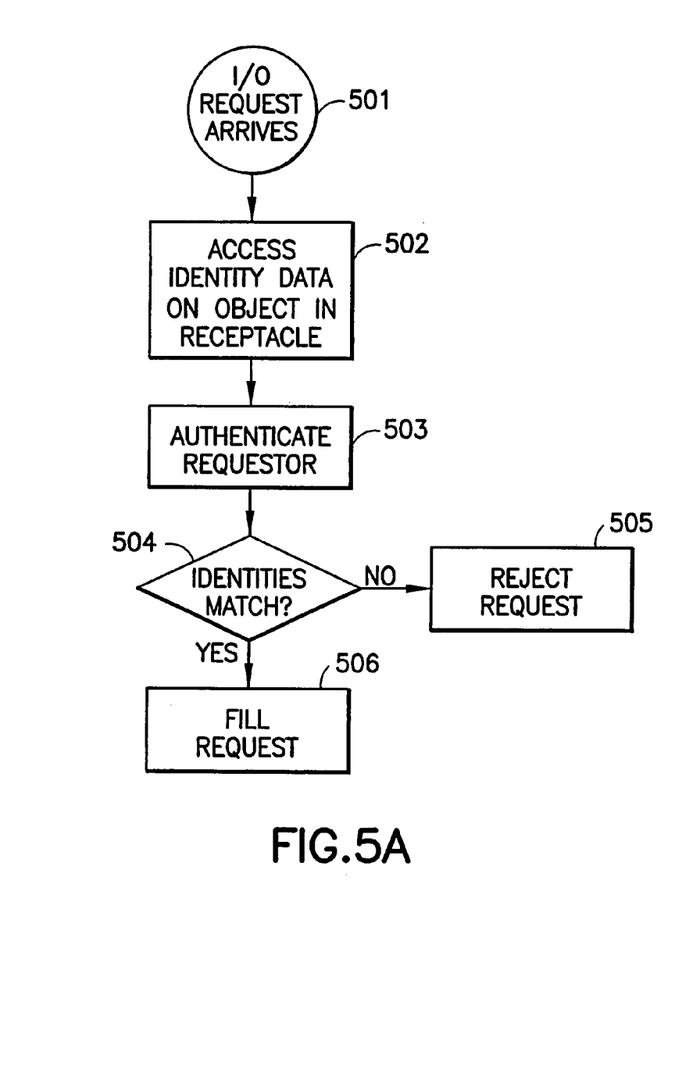
FIGS. 5A and 5B are each a logic flow diagram depicting the operation of the information appliance of FIGS. 1 and 3.

Referring to FIG. 5A, when the information appliance 100 receives a request (501) from the security console 200, or from some other agency, it accesses the data (502) stored in the key 301 that is present in its single receptacle 103, and using cryptographic methods known to the art verifies or authenticates (503) that the request was actually generated by the security console 100. That is, it verifies that the request was actually generated by an entity that has access to the other key of the same key-pair (504), and that the request was intended for it. If this verification fails, the request is rejected (505) or, in an alternate embodiment, the request may be given an "anonymous" level of privilege. If the verification succeeds, the request is fulfilled (504).

In further embodiments of these teachings the information appliance 100 may have two or more receptacles 103, where each of the receptacles may hold a different key 301, and where each key 301 represents a particular relationship that may exist between the information appliance 100 and the possessor of the other key 301 of the key-pair. For example, one receptacle 103 may contain a key 301 carrying data about the security console 200 of the appliance's "home" network, while another receptacle 103 may contain a key 301 carrying data about the security console 1200 of the network that the information appliance 100 is currently a "guest" in. This mode of operation is particularly useful for portable/mobile information appliances 100.

Figure 5B:
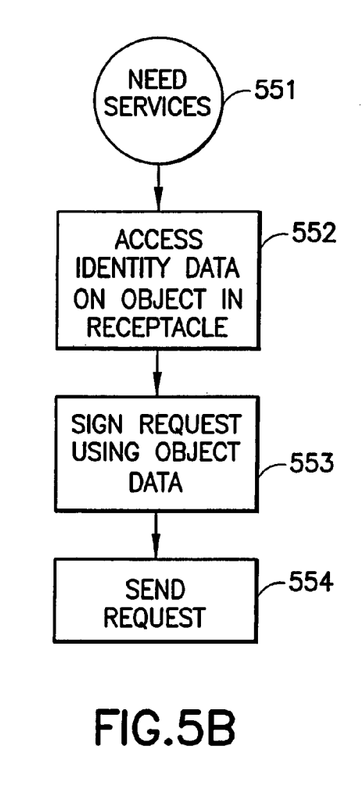

Referring to FIG. 5B, when the information appliance 100 requires the services of the security console (551), or has data to return to it, it accesses the data (552) contained on the key 301 in its single receptacle 103 (or, in alternate embodiments, on the key 301 in one or a plurality of receptacles 103 corresponding to its relationship with the particular security console 200 or other information appliance 100 with which it needs to communicate), and employs the accessed data to encrypt and/or sign the request (553), using methods known to the art. In this manner the security console 200 can determine (see FIG. 4A) that the request was actually generated by this information appliance 100, and was actually intended for the security console 200. The request is then sent from the information appliance to the security console 200 (554).

In this embodiment, all processes and information appliance 100s in the network that require secure services from some other information appliance 100 send their request to the security console 200, using the methods disclosed above, and the security console 200 then acts as an intermediary between the various information appliance 100s and the resources that they provide. For example, a PDA information appliance may access a mass data storage information appliance, via the security console 200. In other embodiments, any two information appliance 100s that need to communicate regularly may share a key-pair, allowing direct secure communication without the intervention of the security console 200 as an intermediary.

When the role that a particular information appliance 100 plays in the network changes, as when a new information appliance 100 is added, or a previously installed information appliance 100 is removed, or some information appliance 100 is changed from trusted to "guest" access or vice-versa, these and other adjustments in the security configuration are accomplished by adding, removing, or moving keys 301 from one receptacle 103/203 to another.

In an alternate embodiment, only the security console 200 and other object-controlling resources include receptacles 203, and the information appliances 100 come packaged with keys 301. To allow the information appliance 100 access to resources on the network, the key 301 corresponding to the information appliance 100 is inserted into the corresponding receptacle 203 on the console 200 or other resource. In this case, each information appliance 100 has its own identity information built into the appliance proper, rather than residing on a separable key.

In another embodiment, only information appliances 100 include receptacles 103, and the security console 200 and other resource objects come packaged with keys corresponding to the various roles. To indicate that a particular information appliance 100 plays a given role in the network, a key 301 from the security console 200 or other resource (corresponding to the desired role) is inserted into the receptacle 103 of the information appliance 100.

In accordance with an aspect of these teachings a newly-obtained information appliance 100 is added to a group of authorized information appliances 100, on behalf of a principal (such as a particular user), by providing a key 301 representing the principal to the receptacle 103 of the information appliance 100. In this case the key 301 representing the principal contains data which includes at least one secret known only to the principal. For example, the secret known only to the principal may be the private half of a public-private key pair associated with an asymmetric cryptosystem.

Further in this regard, a certain principal, and at least one information appliance 100 authorized to act on behalf of the principal, is granted a certain level of access to a certain resource by providing, to the receptacle 103 associated with an information appliance 100 representing the resource, a key 301 representing the principal. In this case data contained in the key 301 representing the principal can be the public half of a public-private key pair associated with an asymmetric cryptosystem.

In another embodiment the key 301 representing a principal could be embodied as a strip of paper or by some other matrix material that includes a computer-readable data portion and (optionally) an image of the principal. A holder can then be provided for holding or supporting the computer-readable data portion such that at least the computer-readable data portion is accessible to the information appliance 100 or to the security console 200. This embodiment can be useful for, by example, establishing guest privileges (limited authorization) to a user of an information appliance 100.

In yet a further embodiment of this invention the console 200 has pre-defined (or configurable) slots for receiving keys that associate privileges for a user. In order to grant privileges to a device, a key is removed from the console 200 and placed in the device. The console 200 is configured such that the console operator can ascertain the name of a key that has been removed from the console 200. An advantage of this embodiment is that privileges that may be granted to the device are immediately obvious by observing which privilege keys are missing from (removed from) the console 200. Conversely, the privileges that are not granted to a device can be ascertained by visual inspection of the console 200.

Figure 6:
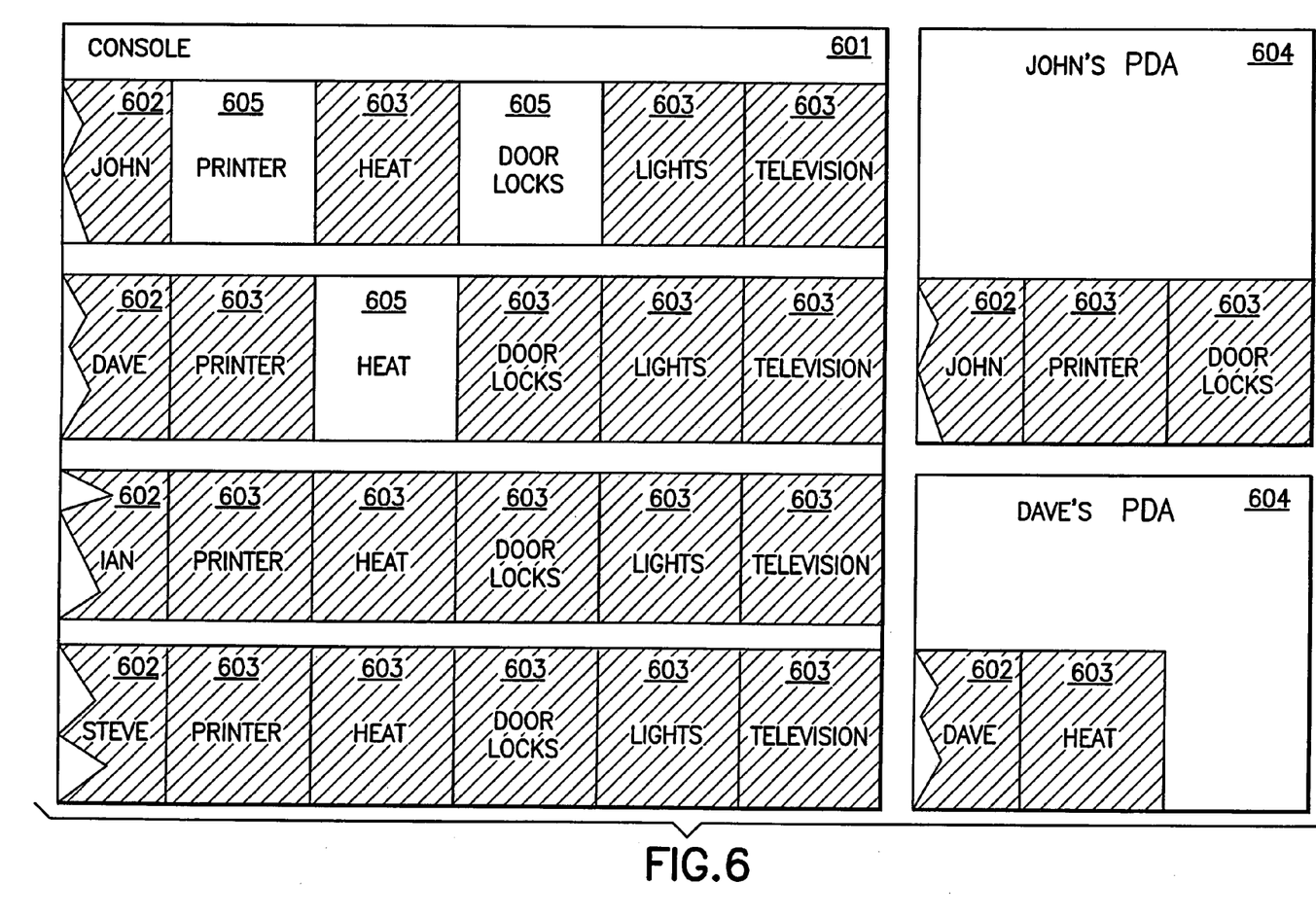
FIG. 6 shows an example of a security console having various keys, including privileges keys, for various users.

In one possible embodiment, and referring to FIG. 6, a security console 601 is arranged to have rows that associate a physical key 602 with a collection of physical keys 603 that represent privileges. Privileges 603 are granted to a user's device 604, such as a PDA, by removing them from the console 601 and inserting them into the device 604, or directly to the physical key 602 which is itself inserted into the device 604. Those physical keys 602 removed from the console 601 are readily identified by visual inspection as being open or empty slots 605.

It is important to recognize that in the foregoing and other embodiments of this invention the key 301 (or 602) is not intended to primarily establish the identity of a particular user or principal, but is instead intended to provide and be instrumental in defining, using a tangible medium, a security configuration that bestows a certain level of authorization or access to a particular user or principal.

For example, if one desires to provide different levels of access rights to a particular program (e.g., an accounting information database or a human resources database), then instead of interacting with a complex configuration menu, a system administrator may instead simply insert keys 301 representing the various users (principals) into appropriate receptacles 203 having outputs coupled to a computer system that runs the program. Further in accordance with this example, there may be one system administrator receptacle 203 enabling total access to the program/database; a plurality of lower priority receptacles for enabling read/write access to some, but not all, of the program/database; and a further plurality of receptacles enabling read-only access to just a portion of the program/database. The owner of the database (principal) may insert his or her half of the key-pair into a receptacle 103 corresponding to the database, and provides the other half to a user who inserts his or her half of the key into an information appliance 100, such as a satellite computer or a PDA, thereby authorizing the user to interact with the program/database. In this case, and by example, if the owner inserts his or her half of the key into a "system administrator" slot, then the user is authorized as a system administrator, while if the owner inserts his or her half of the key into a 'read-only' slot, then the user is authorized to read-only from the database.

In all of the foregoing embodiments the key 301 may be totally passive, such as by having a bar code or a magnetic stripe, while in other embodiments the key 301 could embody some degree of intelligence (e.g., a smart card).

Based on the foregoing description of presently preferred embodiments of these teachings it can be appreciated that there is also provided a computer program embodied on a computer-readable medium, such as in the security console 200 and/or the information appliances 100, for providing for the secure installation and use of the information system. The computer program contains code segments that are responsive to at least one key 301, containing security-related data, that is inserted into at least one receptacle 103, 203, for reading-out the security-related data for determining, for the information system, a desired security configuration.

While the invention has been particularly shown and described with respect to preferred embodiments thereof, it will be understood by those skilled in the art that changes in form and details may be made therein without departing from the scope and spirit of the invention.

What is claimed is:

1. Apparatus for the secure installation and use of an information system comprising:
    a plurality of nodes, where said plurality of nodes includes at least one information appliance and at least one security console,
    at least one data-carrying object containing security-related data; and
    a plurality of object receptacles that comprises a portion of one or more of said nodes, two or more of said object receptacles being connected to said security console, said data-carrying object being inserted into a selected one of said two or more object receptacles that reads out the security-related data, wherein said security console, based on said security-related data and said selected receptacle, establishes a network policy that determines a desired security configuration of said information system with respect to said information appliance and said security console.

2. Apparatus as in claim 1, wherein said data-carrying object stores the security-related data in a form that can be read-out by one of an electrical sensor, an optical sensor, or a magnetic sensor.

3. Apparatus as in claim 1, wherein said data-carrying object remains inserted in said selected receptacle for as long as the security configuration is desired to be in effect.

4. Apparatus as in claim 1, wherein said data-carrying object is temporarily made readable by said selected receptacle in order to initiate said security configuration.

5. Apparatus as in claim 1, wherein said information appliance has associated therewith the security-related data of said data-carrying object, and wherein the information appliance is intended to be used for indicating that the information appliance is one of a trusted information appliance or an untrusted information appliance.

6. Apparatus as in claim 1, wherein said information appliance is given access to information system resources, including information, by inserting an additional data-carrying object associated with said security console into at least one receptacle that has an output that is coupled to said information appliance.

7. Apparatus as in claim 1, wherein each of said information appliance and said security console have associated therewith first and second corresponding data-carrying objects, respectively, wherein said selected receptacle comprises a first receptacle, wherein the information appliance is intended to be used for indicating, from security-related data contained on said first data-carrying object associated with said information appliance, that the information appliance is one that is authorized to fulfil and originate requests for information system resources, and wherein a second one of said receptacles has an output coupled to said information appliance for indicating, from security-related data contained on said second data-carrying object associated with said security console, that said security console is authorized to fulfil and originate requests for information appliance resources, including information.

8. Apparatus as in claim 1, wherein said data carrying object comprises a first one of first and second data-carrying objects that are obtained as a pair, wherein said selected receptacle comprises a first receptacle, wherein the information appliance is intended to be used for indicating, from security-related data contained on said first data-carrying object, that the information appliance is one that is authorized to fulfil and originate requests for information system resources, and wherein a second one of said receptacles has an output coupled to said information appliance for indicating, from security-related data contained on said second data-carrying object, that said security console is authorized to fulfil and originate requests for information appliance resources, including information.

9. Apparatus as in claim 1, wherein said selected receptacle comprises a first receptacle, and wherein an insertion of the data-carrying object into said first receptacle indicates different security-related information than inserting the data-carrying object into a second one of said two or more receptacles.

10. Apparatus as in claim 1, wherein said data-carrying object is one of a pair of data-carrying objects, and wherein the data-carrying objects in any given pair are the same shape, and no two data-carrying objects not in the same pair are the same shape.

11. Apparatus as in claim 1, wherein said data-carrying object is one of a pair of data-carrying objects, and wherein the data-carrying objects in any given pair are imprinted with a same visible identification information, and no two data-carrying objects not in the same pair are imprinted with the same visible identification information.

12. Apparatus as in claim 1, wherein said data-carrying object is one of a pair of data-carrying objects, and wherein the data-carrying objects in any given pair are fashioned so as to mechanically join together, and no two data-carrying objects not in the same pair will not or are unlikely to mechanically join together.

13. Apparatus as in claim 1, wherein said data-carrying object is one of a group of at least three data-carrying objects, and where access to a resource of said information appliance, including information, is obtained by providing one subset of data-carrying objects from said group to a receptacle associated with a requestor of the resource, and a disjoint set of data-carrying objects from said group is provided to the receptacles of the security console.

14. Apparatus as in claim 13, wherein identifications of all individual data-carrying objects in the group can be ascertained by viewing the security console, even if some subset of the data-carrying objects are provided to said receptacle associated with a requestor of the resource.

15. Apparatus as in claim 13, wherein a utilization of different disjoint subsets of the data-carrying objects in said group indicates different levels of trust to be granted to the requestor with respect to the resource.

16. Apparatus as in claim 13, wherein a utilization of different disjoint subsets of the data-carrying objects in said group indicates different levels of authorization to be granted to the requestor with respect to the resource.

17. Apparatus as in claim 13, wherein data-carrying objects in said group mechanically join together to form an assemblage, where the assemblage is adapted to be attached to a device through a single connection.

18. Apparatus as in claim 1, wherein said information appliance is one of a group of information appliances, wherein a newly-obtained information appliance is added to said group on behalf of a principal, by providing an additional data-carrying object representing the principal to a receptacle of the newly obtained information appliance.

19. Apparatus as in claim 18, wherein said data-carrying object representing the principal contains data which includes at least one secret known only to the principal.

20. Apparatus as in claim 19, wherein the secret known only to the principal comprises the private half of a public-private key pair associated with an asymmetric cryptosystem.

21. Apparatus as in claim 1, wherein said information appliance is authorized on behalf of a certain principal, wherein said certain principal, and said information appliance is granted a certain level of access to a certain resource of said information appliance by providing, to one of said receptacles associated with said information appliance representing the resource, an additional data-carrying object representing the principal.

22. Apparatus as in claim 21, wherein data contained in the additional data-carrying object representing the principal comprises the public half of a public-private key pair associated with an asymmetric cryptosystem.

23. Apparatus as in claim 22, in which the additional data-carrying object representing the principal comprises an image of the principal.

24. Apparatus as in claim 22, in which the additional data-carrying object representing the principal comprises a computer-readable data portion and an image of the principal.

25. Apparatus as in claim 24, further comprising a holder for holding the computer-readable data portion such that both the computer-readable data portion and the image are accessible.

26. A method for the secure installation and use of an information system comprising a plurality of nodes, where said plurality of nodes include at least one information appliance and at least one security console, said method comprising steps of:
prov018ing at least one data-carrying object containing security-related data;
inserting the data-carrying object into a selected one of a plurality of object receptacles that comprises a portion of at least one of the nodes, wherein the selected object receptacle is one of two or more of said receptacles that are connected to said security console, the data-carrying object being inserted into the selected receptacle that reads out the security-related data; and
based on the security-related data and the selected object receptacle, establishing a network security policy that determines a desired security configuration of said information system with respect to said information appliance and said security console.

27. A method as in claim 26, wherein the data-carrying object stores the security-related data in a form that can be read-out by one of an electrical sensor, an optical sensor, or a magnetic sensor.

28. A method as in claim 26, wherein the data-carrying object either remains inserted in the selected receptacle during the operation of the information system, or is temporarily inserted in or otherwise made readable by the selected receptacle either before or during the operation of the information system.

29. A method as in claim 26, wherein said information appliance has associated therewith the security-related data of said data-carrying object, wherein the information appliance is intended to be used for indicating that the information appliance is one of a trusted information appliance or an untrusted information appliance.

30. A method as in claim 26, wherein said information appliance is given access to information system resources, including information, by inserting an additional data-carrying object associated with the security console into at least one of the receptacles that has an output that is coupled to the information appliance.

31. A method as in claim 26, wherein each of the information appliance and the security console have associated therewith first and second corresponding data-carrying objects, respectively, wherein said selected receptacle comprises a first receptacle, wherein the information appliance is intended to be used for indicating, from security-related data contained on the first data-carrying object associated with the information appliance, that the information appliance is one that is authorized to fulfil and originate requests for information system resources, and wherein a second one of the receptacles has an output coupled to the information appliance for indicating, from security-related data contained on the second data-carrying object associated with the security console, that the security console is authorized to fulfil and originate requests for information appliance resources, including information.

32. A method as in claim 26, wherein the data carrying object comprises a first one of first and second data-carrying objects that are provided as a pair, wherein the selected receptacle comprises a first receptacle, wherein the information appliance is intended to be used for indicating, from security-related data contained on said first data-carrying object, that the information appliance is one that is authorized to fulfil and originate requests for information system resources, and wherein a second one of the receptacles has an output coupled to the information appliance for indicating, from security-related data contained on said second data-carrying object, that the security console is authorized to fulfil and originate requests for information appliance resources, including information.

33. A method as in claim 26, wherein said selected receptacle comprises a first receptacle, and wherein an insertion of the data-carrying object into said first receptacle indicates different security-related information than inserting the data-carrying object into a second one of said two or more receptacles.

34. A method as in claim 26, wherein the data-carrying object is one of a pair of data-carrying objects, and wherein the data-carrying objects in any given pair are the same shape, and no two data-carrying objects not in the same pair are the same shape.

35. A method as in claim 26, wherein the data-carrying object is one of a pair of data-carrying objects, and wherein the data-carrying objects in any given pair are imprinted with a same visible identification information, and no two data-carrying objects not in the same pair are imprinted with the same visible identification information.

36. A method as in claim 26, wherein the data-carrying object is one of a pair of data-carrying objects, and wherein the data-carrying objects in any given pair are fashioned so as to mechanically join together, and no two data-carrying objects not in the same pair will not or are unlikely to mechanically join together.

37. A method as in claim 26, wherein said data-carrying object is one of a group of at least three data-carrying objects, and where access to a resource of the information appliance, including information, is obtained by providing one subset of data-carrying objects from said group to a receptacle associated with a requester of the resource, and a disjoint set of data-carrying objects from said group is provided to the receptacles connected to the security console.

38. A method as in claim 37, wherein identifications of all individual data-carrying objects in the group can be ascertained by viewing the security console, even if some subset of the data-carrying objects are provided to the receptacle associated with a requestor of the resource.

39. A method as in claim 37, wherein a utilization of different disjoint subsets of the data-carrying objects in said group indicates different levels of trust to be granted to the requestor with respect to the resource.

40. A method as in claim 37, wherein a utilization of different disjoint subsets of the data-carrying objects in said group indicates different levels of authorization to be granted to the requestor with respect to the resource.

41. A method as in claim 37, wherein data-carrying objects in said group mechanically join together to form an assemblage, where the assemblage is adapted to be attached to a device through a single connection.

42. A method as in claim 37, in which access to the resource is denied unless every data-carrying object of the group is inserted into a receptacle.

43. A method as in claim 26, wherein said information appliance is one of a group of information appliances, and further comprising a step of adding a newly-obtained information appliance to said group on behalf of a principal, by inserting an additional data-carrying object representing the principal to a receptacle of the newly obtained information appliance.

44. A method as in claim 43, wherein the data-carrying object representing the principal contains data which includes at least one secret known only to the principal.

45. A method as in claim 44, wherein the secret known only to the principal comprises the private half of a public-private key pair associated with an asymmetric cryptosystem.

46. A method as in claim 26, wherein said information appliance is authorized on behalf of a certain principal, wherein said certain principal, and said information appliance is granted a certain level of access to a certain resource of said information appliance by inserting, to one of said receptacles associated with the information appliance representing the resource, an additional data-carrying object representing the principal.

47. A method as in claim 46, wherein data contained in the additional data-carrying object representing the principal comprises the public half of a public-private key pair associated with an asymmetric cryptosystem.

48. A method as in claim 47, in which the additional data-carrying object representing the principal comprises an image of the principal.

49. A method as in claim 47, in which the additional data-carrying object representing the principal comprises a computer-readable data portion and an image of the principal.

50. A method as in claim 49, further comprising a step of providing a holder for holding the computer-readable data portion such that both the computer-readable data portion and the image are accessible.

51. A computer program embodied on a computer-readable medium for providing for the secure installation and use of an information system comprising a plurality of nodes, where said plurality of nodes include at least one information appliance and at least one security console, said computer program comprising code segments responsive to at least one data-carrying object containing security-related data that is inserted into a selected one of a plurality of object receptacles that comprises a portion of at least one of the nodes, wherein the selected object receptacle reads out the security related data and is one of two or more of said object receptacles that are connected to said security console, and wherein, based on said security-related data and said selected receptacle one or more of said code segments cause said security console to establish a network policy that determines a desired security configuration of said information system with respect to said information appliance and said security console.

52. Apparatus for the secure installation and use of an information system comprising:
   a plurality of nodes, where said plurality of nodes includes at least one information appliance and at least one security console,
   at least first and second physical data-carrying objects each containing security-related data; and
   a first object receptacle and a second object receptacle that are connected to said security console, a third object receptacle connected to said information appliance, said first physical data-carrying object being inserted into a selected one of said first and second object receptacles that reads out the associated security-related data, said second physical data-carrying object being inserted into said third object receptacle that reads out associated security-related data, wherein based on said security-related data and said selected one of said first and second object receptacles said security console establishes a network policy that determines a desired security configuration of said information system, and wherein said security configuration gives access to a resource of one of said information system by said information appliance and said information appliance by said security console.

* * * * *